United States Patent
Zeephat

(10) Patent No.: US 10,620,013 B2
(45) Date of Patent: Apr. 14, 2020

(54) TESTING APPARATUS AND METHOD FOR TESTING A LOCATION-BASED APPLICATION ON A MOBILE DEVICE

(71) Applicant: Sita Information Networking Computing USA, Inc., Atlanta, GA (US)

(72) Inventor: Jerry James Zeephat, Buford, GA (US)

(73) Assignee: SITA Information Networking Computing USA, Inc., Atlanta, GA (US)

(*) Notice: Subject to any disclaimer, the term of this patent is extended or adjusted under 35 U.S.C. 154(b) by 188 days.

(21) Appl. No.: 15/454,779

(22) Filed: Mar. 9, 2017

(65) Prior Publication Data

US 2018/0259358 A1    Sep. 13, 2018

(51) Int. Cl.
| | |
|---|---|
| *G01C 25/00* | (2006.01) |
| *H04M 1/24* | (2006.01) |
| *G06F 11/36* | (2006.01) |
| *G01C 21/20* | (2006.01) |
| *H04W 24/10* | (2009.01) |

(52) U.S. Cl.
CPC ........... *G01C 25/00* (2013.01); *G01C 21/206* (2013.01); *G06F 11/36* (2013.01); *H04M 1/24* (2013.01); *H04W 24/10* (2013.01)

(58) Field of Classification Search
CPC .............................. G01C 25/00; G01C 21/206
USPC .... 73/1.79, 865.8, 865.9, 432.1; 348/61, 64, 348/113, 118, 125, 126, 129, 135, 142, 348/143, 158
See application file for complete search history.

(56) References Cited

U.S. PATENT DOCUMENTS

| | | | |
|---|---|---|---|
| 4,929,819 A * | 5/1990 | Collins, Jr. | ............. A47F 9/047 |
| | | | 235/383 |
| 5,748,850 A | 5/1998 | Sakurai | |
| 5,793,639 A | 8/1998 | Yamazaki | |
| 5,897,620 A | 4/1999 | Walker | |
| 6,044,353 A | 3/2000 | Pugliese, III | |
| 6,259,405 B1 | 7/2001 | Stewart | |
| 6,414,635 B1 | 7/2002 | Stewart | |
| 6,522,998 B1 * | 2/2003 | Mazur | ............... G01M 17/0078 |
| | | | 703/7 |

(Continued)

FOREIGN PATENT DOCUMENTS

| | | |
|---|---|---|
| DE | 102009020228 A1 | 11/2010 |
| EP | 1308864 A1 | 5/2003 |

(Continued)

OTHER PUBLICATIONS

International Search Report and Written Opinion dated May 18, 2018, in international application No. PCT/IB2018/051531.

*Primary Examiner* — Robert R Raevis
(74) *Attorney, Agent, or Firm* — Morris, Manning & Martin, LLP; Daniel E. Sineway, Esq.; Adam J. Thompson, Esq.

(57) ABSTRACT

A testing apparatus (1) for testing a location-based application on a mobile device (14). The apparatus comprises a first platform (10) having a support portion (12) for supporting at least one test mobile device (14); and a support element (20) spaced from the first platform (10). The support element (20) is configured to support a recording device (24) and permit a camera lens on the recording device (24) to view the support portion (12) of the first platform (10).

20 Claims, 2 Drawing Sheets

(56) References Cited

U.S. PATENT DOCUMENTS

| | | |
|---|---|---|
| 6,553,336 B1 | 4/2003 | Johnson |
| 6,735,630 B1 | 5/2004 | Gelvin |
| 6,736,322 B2 | 5/2004 | Gobburu |
| 6,758,394 B2 | 7/2004 | Maskatiya |
| 6,972,682 B2 | 12/2005 | Lareau |
| 7,027,808 B2 | 4/2006 | Wesby |
| 7,275,689 B2 | 10/2007 | Mak |
| 7,486,171 B2 | 2/2009 | Kim |
| 7,599,847 B2 | 10/2009 | Block |
| 8,229,458 B2 | 7/2012 | Busch |
| 8,467,726 B2 | 6/2013 | Shirakata |
| 8,509,441 B2 | 8/2013 | Yoon |
| 8,521,681 B2 | 8/2013 | Ouchi |
| 8,631,358 B2 | 1/2014 | Louch |
| 8,665,238 B1 | 3/2014 | Gossweiler, III |
| 8,949,142 B1 | 2/2015 | Angrish |
| 8,977,568 B1 | 3/2015 | Schattauer |
| 9,024,752 B2 | 5/2015 | Tumayan |
| 9,026,461 B2 | 5/2015 | Calman |
| 9,047,512 B2 | 6/2015 | Otis |
| 9,134,955 B2 | 9/2015 | Healey |
| 9,141,325 B2 | 9/2015 | Dersy |
| 9,239,246 B2 | 1/2016 | Jones |
| 9,275,550 B1 | 3/2016 | Stefani |
| 9,402,016 B1 | 7/2016 | Hidalgo |
| 9,541,632 B2 | 1/2017 | Frank |
| 9,552,564 B1 | 1/2017 | Martenis |
| 9,589,262 B2 | 3/2017 | Graylin |
| 9,589,405 B2 | 3/2017 | Cabouli |
| 9,599,989 B1 | 3/2017 | Brown |
| 9,710,920 B2 | 7/2017 | Utsunomiya |
| 9,749,831 B2 | 8/2017 | Lee |
| 2004/0062051 A1* | 4/2004 | Hsu ................. B60R 1/1207 362/494 |
| 2005/0258230 A1 | 11/2005 | Wiater |
| 2009/0266882 A1 | 10/2009 | Sajkowsky |
| 2010/0310250 A1* | 12/2010 | McAnulty ......... F16M 11/041 396/428 |
| 2012/0041313 A1 | 2/2012 | Tanaka |
| 2012/0186369 A1* | 7/2012 | Matlschweiger ....... G01M 7/08 73/865.3 |
| 2013/0311126 A1* | 11/2013 | Scott ............. G01M 17/0078 702/113 |
| 2014/0047417 A1 | 2/2014 | Kaasila et al. |
| 2014/0069973 A1* | 3/2014 | Peck ................. B60R 11/02 224/411 |
| 2014/0223043 A1 | 8/2014 | Dersy |
| 2014/0339278 A1* | 11/2014 | Ditore ................. B62B 5/00 224/411 |
| 2016/0152350 A1 | 6/2016 | Puentes |
| 2016/0180255 A1 | 6/2016 | Goedemondt |
| 2017/0004444 A1 | 1/2017 | Krasko |
| 2017/0032263 A1 | 2/2017 | Yuan |
| 2018/0218351 A1* | 8/2018 | Chaubard ......... G07G 1/0072 |
| 2019/0073656 A1* | 3/2019 | Joseph ............. G07G 1/0081 |

FOREIGN PATENT DOCUMENTS

| | | |
|---|---|---|
| EP | 0770546 B1 | 12/2003 |
| EP | 2932902 B1 | 12/2016 |
| EP | 1872294 B1 | 11/2017 |
| JP | 2003157984 A | 5/2003 |
| JP | 2017129981 A | 7/2017 |
| WO | 2013082512 A1 | 6/2013 |
| WO | 2015059553 A1 | 4/2015 |

* cited by examiner

TESTING APPARATUS AND METHOD FOR TESTING A LOCATION-BASED APPLICATION ON A MOBILE DEVICE

FIELD OF THE INVENTION

This invention relates to an apparatus and method for testing a location-based application on a mobile device. It is particularly, but not exclusively, concerned with testing location-based applications for use in large public spaces, such as airports, offices, shopping centres, event stadiums and rail or road stations.

BACKGROUND TO THE INVENTION

Location-based applications on mobile devices are becoming increasingly popular, and consequently more sophisticated. One growing area of development concerns applications for use in large public spaces, such as airports, shopping centres, car parks, Hospitals and the like. Such applications can make use of Global Positioning System (GPS) to determine a device's location, but GPS technology may not work reliably indoors. So today, many applications can alternatively or additionally make use of other technologies, such as Wi-Fi triangulation or Bluetooth Low Energy Beacons, within said public spaces to provide their location specific services. For example, it may be desirable to provide an application for use in an event stadium, whereby specific services can be offered based on where a spectator is seated. For example, it may be desirable to provide users in premium seating with a service that allows them to order consumables directly to their seat. As another example, airline operators may wish to provide passengers with a guide for navigating a particular airport, such a route or set of instructions for transferring between flights or locating a particular passenger lounge.

Such services can require very accurate location information in order to provide the full level of desired functionality, and therefore testing of such applications at the ground level is critical to ensure proper functionality. However, application developers are typically not in a position to conduct such testing themselves, and consequently testing by local personnel is normally required at each site. This testing is often done on an ad-hoc basis with the local testing person carrying the mobile device around in their hand on the site and later reporting back on any identified problems. This can be inefficient and result in problems with the applications being missed or misreported.

Consequently, it would be desirable to improve the manner in which location-based application for mobile devices can be tested on site.

SUMMARY OF THE INVENTION

According to a first aspect of the invention there is provided a testing apparatus for testing a location-based application on a mobile device, the apparatus comprising: a first platform having a support portion for supporting at least one test mobile device; and a support element spaced from the first platform and held in a fixed position relative to the first platform, the support element being configured to support a recording device and permit a camera lens on the recording device to view the support portion of the first platform.

The apparatus of the first aspect of the present invention advantageously provides an effective means for enabling a test person to test a location-based application on a mobile device in a test environment, whilst simultaneously recording the performance of the location-based application on the mobile device. This can enable the performance of the application to be analysed by any number of additional persons (in addition to the test person), irrespective of where those additional persons are located. Consequently, a person who is more qualified to understand the performance of the application, can view one or more images or videos captured by the recording device during testing, and analyse the performance of the application. This can improve the efficiency of the testing process, and potentially lead to better identification of problems in the applications. The image or videos captured by the recording device may be sent directly to the additional persons during testing (such as in the form of a live stream), or may be stored on a memory in the recording device, and later sent to the additional persons after testing.

Arranging for at least one test mobile device to be supported by the first platform and the recording device to be supported by a support element that is spaced from the first platform and held in a fixed position relative to the first platform, can help to improve the quality of the video or image captured, since the at least one test mobile device is less likely to move relative to the recording device during testing. This can also reduce the burden on the test person, since they are no longer required to directly hold a test mobile device in their hand during testing.

Furthermore, the apparatus of the first aspect of the present invention can also advantageously allow a test person to simultaneously test more than one test mobile device at a time, and simultaneously capture the performance of said devices using a single recording device. This can allow for comparison analysis between different devices. For example, the performance of a location-based application a device supplied by a first manufacturer may be compared with the simultaneous performance of said application on a device supplied by a second manufacturer. This can help the likes of an application developer to determine whether their application is functioning correctly across multiple platforms and/or multiple ranges of device. Accordingly, in preferred embodiments, the first platform is configured to support two or more test mobile device, such that a recording device supported by the support element can view said two or more devices.

The support element may take any suitable form. In some preferred embodiments, the support element is a clamp configured to grip the recording device and hold the recording device in a fixed position relative to the first platform.

Alternatively, in some other preferred embodiments, the support portion is a second platform configured to support the recording device and hold the recording device in a fixed position relative to the first platform. In such embodiments, preferably, the second platform comprises a viewing port for enabling the camera lens on the recording device to view the support portion of the first platform. The viewing port may have any suitable shape or size. Preferably, the viewing port is provided in the form of a hole or cut-out in the second platform. Preferably the viewing port is disposed in a central region of the second platform. The viewing port can help a test person to easily determine where to locate the recording device in order for its lens to view the support portion of the first platform. Furthermore, the viewing port may allow the second platform to be formed from a non-transparent material, which may be desirable from a manufacturing perspective.

As an alternative or in addition to a viewing port, in some preferred embodiments, at least a portion of the second platform is substantially transparent. That is, the second platform may be formed from a substantially transparent material, such as glass or plastic. Such embodiments can advantageously allow the test person to view test mobile devices on the first platform through the second platform. This can help the test person to be more certain that the location-based applications are running on the one or more test mobile devices during testing.

The term "substantially transparent" is used herein to describe a material which allows at least a sufficient proportion of incident light to pass through it so that it is possible to see through the material. In the present invention, the substantially transparent second platform allows sufficient light to pass through it such that the support portion of the underlying first platform is visible through the second platform. The transparency of the substantially transparent material of the second platform may be evaluated in accordance with ASTM D1003-13.

Where the support element is a second platform, preferably the plane of the second platform is substantially parallel to the plane of the first platform.

Preferably, the apparatus further comprises a mirror assembly comprising at least one mirror disposed between the first platform and the support element and orientated at an angle that is offset from the first platform. That is, the at least one mirror preferably has a reflective surface that extends along a plane, which is offset from the plane of the first platform by a given angle. In embodiments where the support element is a second platform, preferably the at least one mirror has a reflective surface that extends along a plane, which is also offset from the plane of the second platforms by a given angle.

Preferably, the angle is between 30 and 60 degrees, more preferably between about 40 and 50 degrees. The at least one mirror may be disposed on the support portion of the first platform. Such a mirror assembly is configured to reflect incoming light from a front side of the apparatus towards the support element, and in particular, towards the lens of the recording device, when a recording device is present. Accordingly, in embodiments where the support element is a second platform comprising a viewing port, the mirror assembly is configured to reflect incoming light from a front side of the apparatus towards the viewing port of the second platform. This advantageously allows the recording device to also capture a reflected image of the view from the front side of the apparatus, when the apparatus is being used to facilitate testing of a location-based application of one or more mobile devices. This can help to provide additional reference information in the captured data, which can be used when determining whether the location-based application is working satisfactorily.

In some preferred embodiments, the mirror assembly comprises: a first planar mirror disposed between the first platform and the support element and orientated at an angle that is offset from the first platform; a second concave mirror aligned with the first planar mirror; and a third convex mirror aligned with the second concave mirror. Preferably, the second and third mirrors are disposed outside of the space between first platform and the support element. In such embodiments, the second and third mirrors are preferably attached to the remainder of the apparatus by one or more supports, such as one or more respective support bars. For example, each support may attach a mirror to the first platform. The first planar mirror may be disposed on the support portion of the first platform, or on another portion of the first platform.

Where the mirror assembly comprises such first, second and third mirrors, said mirrors may together define a path for reflecting incoming light from a front side of the apparatus towards the support element, and in particular, towards the lens of the recording device, when a recording device is present. That is, the third convex mirror is configured to reflect incoming light from the front side of the apparatus towards the second concave mirror, the second concave mirror is configured to reflect said incoming light on towards the first planar mirror, and the first planar mirror is configured to reflect said incoming light on towards the support element, and in particular, towards the lens of the recording device, when a recording device is present.

In this way, the recording device can also capture a reflected image of the view from the front side of the apparatus, when the apparatus is being used to facilitate testing of a location-based application one or more of the mobile devices. By arranging for the third mirror to be convex, an expanded field of view can be obtained. Furthermore, by arranging for the second mirror to be concave, the incoming image can be inverted before it reaches the lens of the recording device, so that the image captured by the recording device from the first planar mirror has an orientation that matches the orientation of the field of view that an operator would have when operating the testing apparatus. This can help to further improve the information that is recorded by the lens of the recording device when the location-based application is being tested, and thus can help to further improve the overall efficiency and effectiveness of the testing process.

Preferably, the second concave mirror and the third convex mirror are positioned externally to the space residing between the first platform and the support element.

Preferably, the apparatus further comprises a mechanism for attaching the recording device to the support element. For example, the attachment mechanism may be formed by one or more clips that one or more portions of the recording device engage with.

Preferably, the apparatus further comprises a mechanism for attaching the at least one test mobile device to the first platform. For example, the attachment mechanism may be formed by one or more clips that one or more portions of the test mobile device engage with.

Preferably, the apparatus further comprises a navigation instrument disposed on the first platform, more preferably disposed on the support portion of the first platform. Preferably, the navigation instrument is a compass. The navigation instrument may also be viewable by the recording device, and thus can provide an indication of the orientation of the apparatus in any content that is recorded by the recording device when it resides on the second platform. This may provide a useful reference for the content that is recorded.

The support element may be spaced from the first platform and held in a fixed position relative to the first platform by any suitable means. Preferably, the apparatus comprises one or more support rods for spacing and securing the first platform relative to the support element.

The one or more supports rods may be disposed at any suitable position on the apparatus. However, preferably, the each of the one or more support rods is disposed about a peripheral region of the apparatus. This can leave more space free in a central region of the apparatus for the one or more test devices and the recording device to be located. The one or more support rods are preferably collapsible, such as by being telescopically collapsible, to enable the support element to be positioned proximate to the first platform when not in use. This advantageously means that the apparatus will require less storage space when not in use.

In embodiments where the support element is a clamp, the one or more support rods preferably comprises a single support rod extending from the first platform to the clamp. The single rod may comprise one or more joints for enabling the clamp to be repositioned at different points above the first platform.

In embodiments where the support element is a second platform, preferably each of the first and second platforms has the general shape of a four sided polygon, such as a square or rectangle, and each support rod connects a corner of the first platform to a respective corner of the second platform. Using a one or more support rods to space and secure the first platform relative to the support element, can advantageously allow a test person to easily access the support portion of the first platform, whilst also providing a steady and secure attachment for a recording device.

Preferably, the apparatus comprises a mechanism for attaching the testing apparatus to a trolley. For example, the apparatus may comprise a clamp which is configured to grip a portion of a trolley, such as a horizontal bar. Alternatively or additionally, the apparatus preferably comprises a harness for enabling the testing apparatus to be carried by a testing person.

Preferably, one or more holes are provided on the first platform proximate to the support portion of the first platform. Each hole may be used to pass a cable, such as a charging cable, from underneath the first platform to one of the test mobile devices. This can be particularly beneficial when the apparatus is being supported by a trolley, since the trolley can be used to house a power source, which can supply power to the mobile devices, via said cables. Such an arrangement may be particularly desirable where the apparatus is being used to test a number of devices at any one time, over a large test area, over a long duration of time, or any combination thereof.

According to a second aspect of the invention, there is provided a method for testing a location-based application on a mobile device, the method comprising the steps of: placing at least one test mobile device on a support portion of a first platform of a test apparatus; arranging for a recording device to be held by a support element of the test apparatus in a fixed position relative to the first platform, such that a camera lens of the recording device can view the at least one test mobile device on the first platform; initiating a location-based application on the at least one test mobile device; and initiating a record function on the recording device such that testing of the location-based application on the at least one test mobile device is recorded. Each step of initiating may be performed before or after each step of placing. Where the apparatus comprises additional components, such as a mirror assembly or a navigation instrument, the recording device is preferably placed on the second platform of the test apparatus, such that its camera lens can additionally view one or more of said additional components.

The phrase "initiating a record function on the recording device" is used herein to refer to the capturing of video or image content through the lens of the recording device. The captured content may be stored on the recording device for later review by a qualified person. Alternatively or additionally, the captured content could be streamed to a qualified person for them to review the content as it is being captured. In such a scenario, the testing person is preferably provided with a communication channel for communicating with the qualified person as they are capturing the content.

Preferably, the method further comprises the steps of: transporting the apparatus with the supported at least one test mobile device and recording device around a test site; and recording the performance of the location-based application on the at least one test mobile device, at two or more locations in the test site, by way of the lens of the recording device. Preferably, the method further comprises sending the data recorded by the recording device to one or more additional persons. This may include first storing the recorded data on a memory in the recording device.

It will be appreciated that features described above in respect of the first aspect of the invention are equally applicable and preferable for the second aspect of the invention.

BRIEF DESCRIPTION OF DRAWINGS

Embodiments of the invention will now be described, by way of example only, and with reference to the accompanying drawings, in which.

Figure 1:
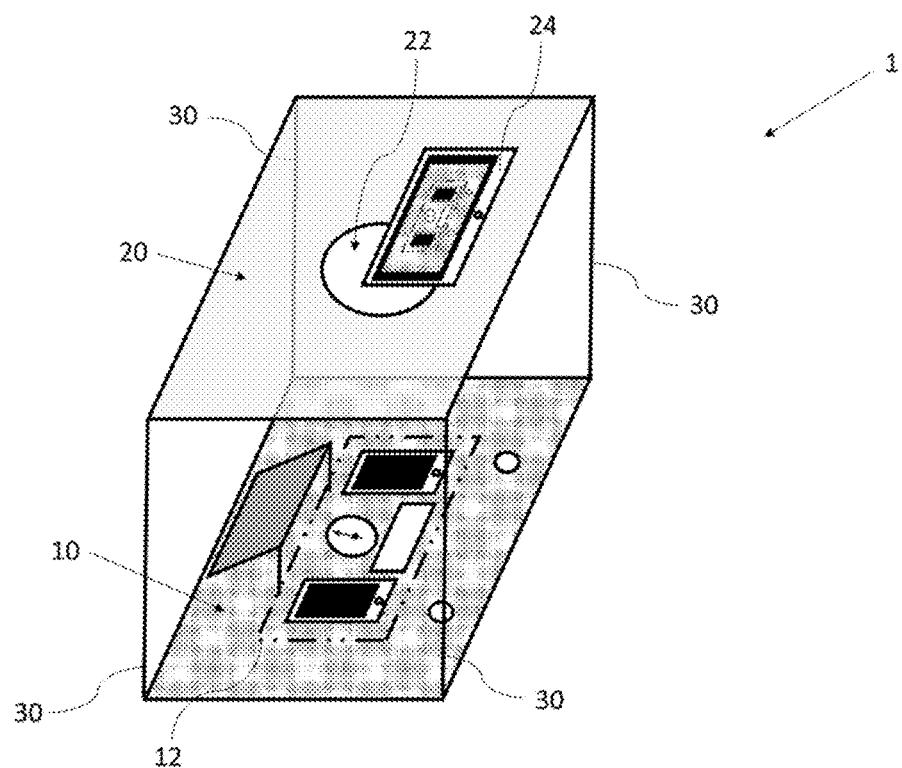
FIG. 1 shows a perspective view of an apparatus according to a first embodiment of the present invention.
Figure 2:
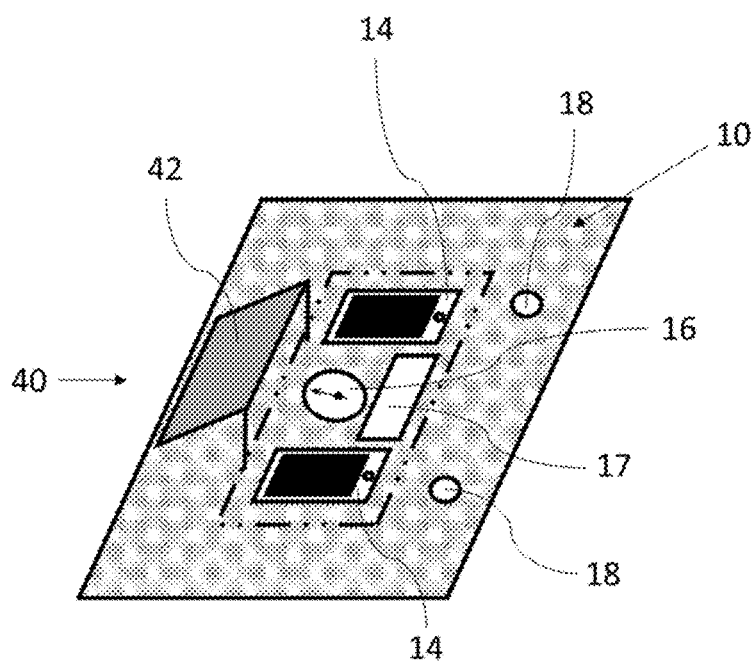
FIG. 2 shows a perspective view of the first platform of the apparatus of FIG. 1.

As can be seen from FIGS. 1 and 2, an apparatus 1 according to a first embodiment of the invention comprises a first platform 10 having a support portion 12 that supports a plurality of test mobile devices 14, which in FIGS. 1 and 2 are test mobile phones.

The apparatus also comprises a support element, which is shown in the figures in the form of a second platform 20. The second platform 20 is spaced from and secured to the first platform 10 by a plurality of support rods 30, with each rod 30 connecting a corner of the first platform 10 to a respective corner of the second platform 20. The second platform 20 is formed of a substantially transparent material, such as glass, and comprises a viewing port 22 in the form of a cut out or hole in a central region of the substantially transparent material of the second platform 20.

A recording device 24, in the form of a tablet device, is disposed on the second platform 20, in a position whereby a lens on the recording device 24 overlies the viewing port 22. This allows the lens on the recording device 24 to view the support portion 12 of the first platform 10, and in particular, to view the test devices 14 that are disposed on the support portion 12 of the first platform 10. It will be appreciated that the recording device 24 could alternatively be disposed in other positions on the second platform 20, whereby the lens of the recording device overlies the substantially transparent material of the second platform 20, and the lens on the recording device 24 be capable of viewing the support portion 12 of the first platform 10 through the transparent material of the second platform 20.

Although not visible in FIG. 1, the recording device 24 could be attached to and held in a fixed position on the second platform 20, by an attachment mechanism on the second platform 20. The attachment mechanism could be formed by one or more clips that one or more portions of the recording device 24 engage with.

As best seen from FIG. 2, the support portion 12 of the first platform 10 is also provided with a navigation instrument 16, in the form of a compass. This is also viewable by the recording device 24, and can provide an indication of the orientation of the apparatus 1 in any content that is recorded by the recording device 24 when it resides on the second platform 20. The support portion 12 also includes an editable zone 17 onto which a testing person can input information relating to the testing that they intend to carry out using the apparatus 1. The editable zone may be one or more sheets of paper, such a pad of paper, or may be a whiteboard.

The first platform 10 also supports a mirror assembly 40, which in the embodiment of FIGS. 1 and 2 consists solely of a planar mirror 42 that is offset from the planes of the first and second platforms 10, 20 by an angle of approximately 45 degrees. The mirror assembly 40 is positioned and orientated so that it can reflect incoming light from a front side of the apparatus 1 towards the second platform 20, and in particular, towards the lens of the recording device 24. This allows the recording device to also capture a reflected image of the view from the front side of the apparatus 1, when the apparatus 1 is being used to facilitate testing of a location-based application one or more of the mobile devices 14. This can help to provide additional reference information in the captured data, which can be used when determining whether the location-based application is working satisfactorily.

The first platform 10 also includes two holes 18 proximate to the support portion 12 of the first platform 10. Each hole 18 can be used to pass a cable, such as a charging cable, from underneath the first platform 10 to one of the test mobile devices 14. This can be particularly beneficial when the apparatus 1 is being supported by a trolley, since the trolley can be used to house a power source, which can supply power to the mobile devices 14, via said cables. Such an arrangement may be particularly desirable where the apparatus is being used to test a number of devices at any one time, over a large test area, over a long duration of time, or any combination thereof.

Although not visible in FIG. 1 or 2, each of the test mobile devices 14 could be attached to and held in a fixed position on the first platform 10, by an attachment mechanism on the first platform 10. The attachment mechanism could be formed by one or more clips that one or more portions of the test mobile devices 14 engage with.

Figure 3A:
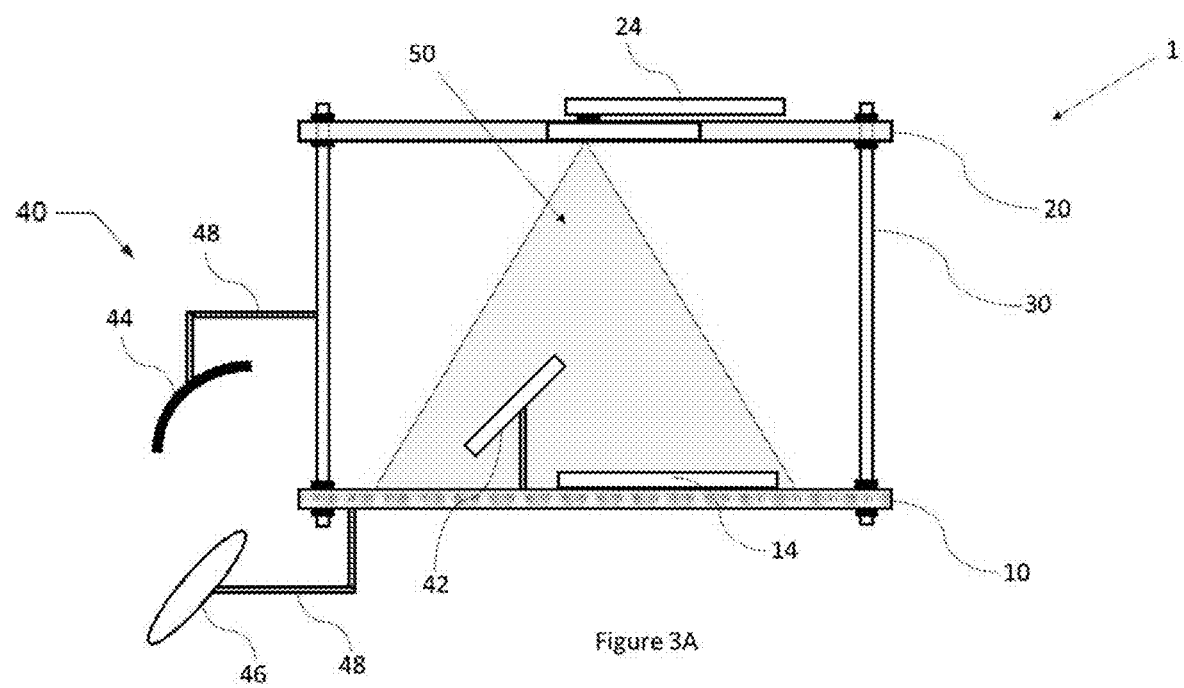
FIGS. 3A and 3B shows side views of an apparatus according to a second embodiment of the present invention.
Figure 3B:
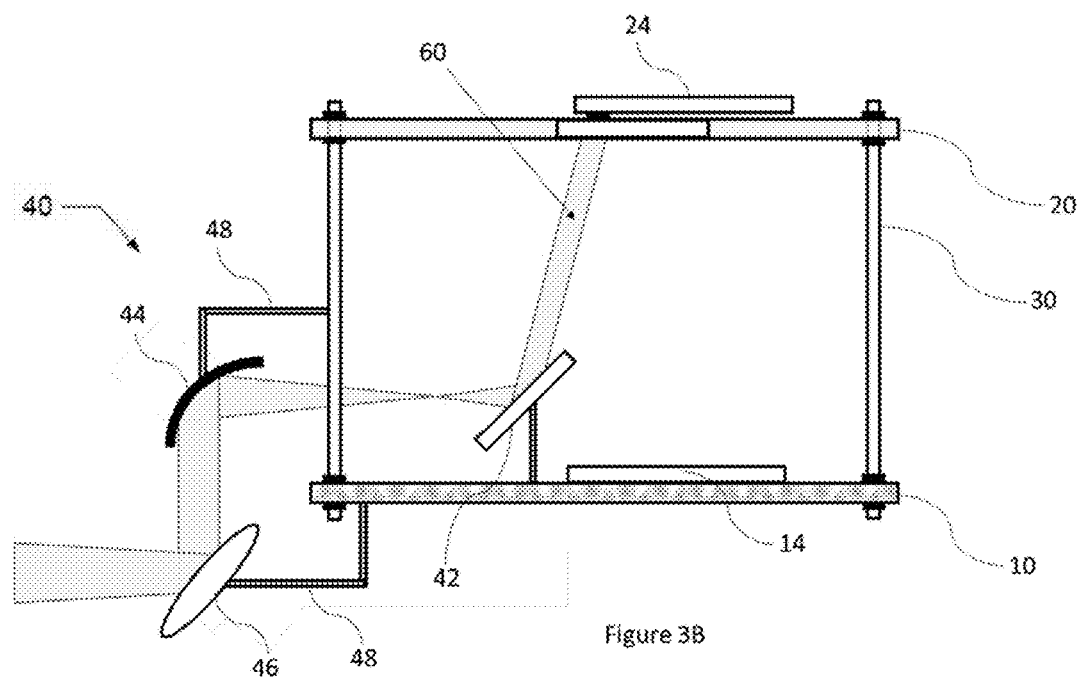

FIGS. 3A and 3B shows side views of an apparatus 1 according to a second embodiment of the present invention. FIG. 3A depicts a side view of the apparatus 1, with an indication 50 of the viewing range of the lens of the recording device 24.

The apparatus of FIGS. 3A and 3B is similar to that of FIG. 1, but has an alternative mirror assembly 40. In particular, as with the mirror assembly of FIG. 1, the mirror assembly 40 of FIGS. 3A and 3B also comprises a first planar mirror 42 that is disposed between the first platform 10 and the second platform 20 and is orientated at an angle that is offset from the planes of the first and second platforms 10, 20. However, the mirror assembly of FIGS. 3A and 3B additionally comprises a second concave mirror 44 aligned with the first planar mirror 42; and a third convex mirror 46 aligned with the second concave mirror 44.

The second and third mirrors 44, 46 are disposed outside of the space between first and second platforms 10, 20, and fixed to the apparatus by supports 48. As best seen from FIG. 3B, the first, second and third mirrors 42, 44, 46 of the mirror assembly 40 together define a path 60 for reflecting incoming light from a front side of the apparatus 1 towards the second platform 20, and in particular, towards the lens of the recording device 24. That is, incoming light from the front side of the apparatus 1 is reflected by the third convex mirror 46 towards the second concave mirror 44. The second concave mirror 44 then reflects said incoming light on towards the first planar mirror 42, which in turn reflects said incoming light towards the lens of the recording device 24. In this way, the recording device 24 can also capture a reflected image of the view from the front side of the apparatus 1, when the apparatus 1 is being used to facilitate testing of a location-based application on one or more of the mobile devices 14. By arranging for the third mirror 46 to be convex, an expanded field of view can be obtained. Furthermore, by arranging for the second mirror 44 to be concave, the incoming image can be inverted before it reaches the lens of the recording device 24, so that the image captured by the recording device 24 from the first planar mirror 42 has an orientation that matches the orientation of the field of view that an operator would have when operating the test apparatus 1.

To use the apparatus 1 of any of FIGS. 1 to 3B, a test person places at least one test mobile device 14 on the support portion 12 of the first platform 10, and a recording device 24 on the second platform 20 of the apparatus 1. The recording device 24 is placed so that its lens overlies the viewing port 22, allowing the lens to view at least the support portion 12 of the underlying first platform 10. Before or after placement of the devices 14, 214 the test person initiates a location-based application on the at least one test mobile device 14; and initiates a record function on the recording device 24 such that recording device can record the view of the test mobile devices 14 on the first platform. Additionally, in the embodiments of FIGS. 1 to 3B, the recording device 24 also records the view of the mirror 42, the navigation instrument 16, and the editable zone 17.

The test person then transports the apparatus 1 with the supported devices 14, 24 around a test site, such as an airport, and records the performance of the location-based application on the test mobile device 14, at various different locations in the test site. Recorded data, such as a video or image, is then sent from the recording device 24 to another person or persons for analysis. The recorded data may be sent directly to the additional persons during testing (such as in the form of a live stream), or may be stored on a memory in the recording device, and later sent to the additional persons after testing.

Although the above description relates to testing of location-based applications for use in an airport, it is to be understood that the method and apparatus of the present invention is not limited to airports but may be applied to any other space, such as shopping centres, offices, event stadiums and rail or road stations. Many other variations and modifications are possible and will occur to those skilled in the art without departing from the scope of the invention which is determined by the following claims.

Embodiments of the invention can be described with reference to the following numbered clauses 1 to 16, with preferred features laid out in the dependent clauses.

1. A testing apparatus for testing a location-based application on a mobile device, the apparatus comprising:
   a first platform having a support portion for supporting at least one test mobile device; and
   a support element spaced from the first platform and held in a fixed position relative to the first platform, the support element being configured to support a recording device and permit a camera lens on the recording device to view the support portion of the first platform.

2. An apparatus according to clause 1, wherein the support element is a clamp configured to grip the recording device and hold the recording device in a fixed position relative to the first platform.

3. An apparatus according to clause 1, wherein the support element is a second platform configured to support the recording device and hold the recording device in a fixed position relative to the first platform.

4. An apparatus according to clause 3, wherein the second platform comprises a viewing port for enabling the camera lens on the recording device to view the support portion of the first platform.

5. An apparatus according to clause 3 or clause 4, wherein at least a portion of the second platform is substantially transparent.

6. An apparatus according to any one of the preceding clauses, further comprising a mirror assembly comprising at least one mirror disposed between the first platform and the support element and orientated at an angle that is offset from the first platform.

7. An apparatus according to clause 6, wherein the mirror assembly comprises:
a first planar mirror disposed between the first platform and the support element and orientated at an angle that is offset from the first platform;
a second concave mirror aligned with the first planar mirror; and
a third convex mirror aligned with the second concave mirror.

8. An apparatus according to clause 7, wherein the second concave mirror and the third convex mirror are positioned externally to the space residing between the first platform and the support element.

9. An apparatus according to any one of the preceding clauses, further comprising a mechanism for attaching the recording device to the support element.

10. An apparatus according to any one of the preceding clauses, further comprising a mechanism for attaching the at least one test mobile device to the first platform.

11. An apparatus according to any one of the preceding clauses, further comprising a navigation instrument disposed on the first platform.

12. An apparatus according to any one of the preceding clauses, further comprising one or more support rods for securing the first platform relative to the support element.

13. An apparatus according to any one of the preceding clauses, further comprising a mechanism for attaching the apparatus to a trolley.

14. An apparatus according to any one of the preceding clauses, further comprising a harness for enabling the apparatus to be carried by a testing person.

15. An apparatus according to any one of the preceding clauses, wherein one or more holes are provided on the first platform proximate to the support portion of the first platform.

16. A method for testing a location-based application on a mobile device, the method comprising:
placing at least one test mobile device on a support portion of a first platform of a testing apparatus;
arranging for a recording device to be held by a support element of the test apparatus in a fixed position relative to the first platform, such that a camera lens of the recording device can view the at least one test mobile device on the first platform;
initiating a location-based application on the at least one test mobile device; and
initiating a record function on the recording device such that testing of the location-based application on the at least one test mobile device is recorded.

The invention claimed is:

1. A system for testing a location-based software application running on a mobile device, the system comprising:
a first platform having a support portion for supporting at least one mobile device under test running a location-based software application; and
a support element spaced from the first platform and held in a fixed position relative to the first platform, the support element being a second platform configured to support a recording device in a fixed position relative to the first platform and permit a camera lens on the recording device to view the support portion of the first platform, wherein the system is sized and shaped for transportation by a test person around a test site,
wherein the second platform comprises a viewing port for enabling the camera lens on the recording device to view the support portion of the first platform, and/or wherein at least a portion of the second platform is substantially transparent.

2. A system according to claim 1, further comprising a mechanism for attaching the recording device to the support element.

3. A system according to claim 1, further comprising a mechanism for attaching the at least one test mobile device to the first platform.

4. A system according to claim 1, further comprising one or more support rods for securing the first platform relative to the support element.

5. A system according to claim 1, further comprising a mechanism for attaching the system to a trolley.

6. A system according to claim 1, wherein the system is sized and shaped for transportation by the person around the test site via a harness.

7. A system according to claim 1, wherein one or more holes are provided on the first platform proximate to the support portion of the first platform.

8. The system of claim 1, further comprising at least one mirror affixed to the first platform at a position proximate to the support portion and at an angle of about 45 degrees from the first platform.

9. The system of claim 8, wherein a surface of a camera lens on the recording device is oriented parallel to the first platform to permit view of the at least one mirror and the at least one test mobile device by the camera lens.

10. A system for testing a location-based software application running on a mobile device, the system comprising:
a first platform having a support portion for supporting at least one mobile device under test running a location-based software application;
a support element spaced from the first platform and held in a fixed position relative to the first platform, the support element being configured to support a recording device and permit a camera lens on the recording device to view the support portion of the first platform, wherein the system is sized and shaped for transportation by a test person around a test site, and
at least one mirror disposed between the first platform and the support element and orientated at an angle that is offset from the first platform.

11. A system according to claim 10, wherein the support element is a clamp configured to grip the recording device and hold the recording device in a fixed position relative to the first platform.

12. A system according to claim 10, wherein the at least one mirror is a first planar mirror disposed between the first platform and the support element and orientated at an angle that is offset from the first platform, and the system further comprises:
  a second concave mirror aligned with the first planar mirror; and
  a third convex mirror aligned with the second concave mirror.

13. A system according to claim 12, wherein the second concave mirror and the third convex mirror are positioned externally to a space residing between the first platform and the support element.

14. A system according to claim 10, wherein the support element is a second platform configured to support the recording device in a fixed position relative to the first platform, and
  wherein second platform comprises a viewing port for enabling the camera lens on the recording device to view the support portion of the first platform, and/or wherein at least a portion of the second platform is substantially transparent.

15. A system according to claim 10, further comprising a navigation instrument located on the first platform.

16. A system according to claim 15, wherein the support element is a second platform configured to support the recording device in a fixed position relative to the first platform, and
  wherein second platform comprises a viewing port for enabling the camera lens on the recording device to view the support portion of the first platform, and/or wherein at least a portion of the second platform is substantially transparent.

17. A system according to claim 10, further comprising one or more support rods for securing the first platform relative to the support element.

18. A system for testing a location-based software application running on a mobile device, the system comprising:
  a first platform having a support portion for supporting at least one mobile device under test running a location-based software application; and
  a support element spaced from the first platform and held in a fixed position relative to the first platform, the support element being configured to support a recording device and permit a camera lens on the recording device to view the support portion of the first platform, wherein the system is sized and shaped for transportation by a test person around a test site, and
  a navigation instrument located on the first platform.

19. A system according to claim 18, wherein the support element is a second platform configured to support the recording device in a fixed position relative to the first platform, and
  wherein second platform comprises a viewing port for enabling the camera lens on the recording device to view the support portion of the first platform, and/or wherein at least a portion of the second platform is substantially transparent.

20. A method for testing a location-based software application running on a mobile device, the method comprising:
  supporting, via a first platform having a support portion, at least one mobile device under test running the location-based software application;
  supporting, via a support element spaced from the first platform and held in a fixed position relative to the first platform, a recording device;
  permitting a camera lens on the recording device to view the support portion of the first platform; and
  orienting at least one mirror disposed between the first platform and the support element at an angle that is offset from the first platform, wherein a structure comprises the first platform, the support element, the camera lens, and the at least one mirror and the structure is sized and shaped for transportation by a test person around a test site.

* * * * *